(12) United States Patent
Speight et al.

(10) Patent No.: US 12,516,360 B2
(45) Date of Patent: Jan. 6, 2026

(54) PH- AND TEMPERATURE-STABLE ETHERIC SOPHOROLIPIDS AND THEIR USE

(71) Applicant: LOCUS SOLUTIONS IPCO, LLC, Solon, OH (US)

(72) Inventors: Lee Speight, Solon, OH (US); Daniel Hagaman, Mechanicsville, VA (US); Andrew Morris, Richmond, VA (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

(21) Appl. No.: 18/268,373

(22) PCT Filed: Jun. 7, 2023

(86) PCT No.: PCT/US2023/068032
§ 371 (c)(1),
(2) Date: Jun. 20, 2023

(87) PCT Pub. No.: WO2023/240111
PCT Pub. Date: Dec. 14, 2023

(65) Prior Publication Data
US 2025/0129401 A1    Apr. 24, 2025

Related U.S. Application Data

(60) Provisional application No. 63/350,093, filed on Jun. 8, 2022.

(51) Int. Cl.
*C12P 17/00* (2006.01)
*C07H 15/00* (2006.01)
*C12P 19/44* (2006.01)

(52) U.S. Cl.
CPC ............... *C12P 19/44* (2013.01); *C07H 15/00* (2013.01)

(58) Field of Classification Search
CPC ........... C12P 19/44; C07H 15/00; C07H 1/00; C07H 15/06; C07H 15/04; C07H 15/10
(Continued)

(56) References Cited

U.S. PATENT DOCUMENTS

2008/0076165 A1* 3/2008 Gross ...................... C12P 21/00
                                                          435/244
2009/0186835 A1 7/2009 Gross et al.
(Continued)

FOREIGN PATENT DOCUMENTS

CN    103275140 B    5/2016
CN    106011108 A    10/2016
(Continued)

OTHER PUBLICATIONS

STIC Search Report dated Aug. 20, 2025.*
(Continued)

*Primary Examiner* — Eisa B Elhilo
(74) *Attorney, Agent, or Firm* — Benesch Friedlander Coplan & Aronoff LLP

(57) ABSTRACT

The present invention provides modified sophorolipids of formula (I) that are more pH-and temperature-stable than its lactonic counterparts. Moreover, the compound has reduced HLB parameters, as well as improved wetting and solubilization parameters, water-in-oil emulsification ability, surface tension-lowering activity, and/or antimicrobial activity compared to their acidic or even lactonic counterparts.

20 Claims, 2 Drawing Sheets

(58) Field of Classification Search
USPC .......................................................... 504/292
See application file for complete search history.

(56) References Cited

U.S. PATENT DOCUMENTS

| | | | |
|---|---|---|---|
| 2011/0250153 A1 | 10/2011 | Owen et al. | |
| 2012/0142621 A1* | 6/2012 | Falus | C12P 19/44 435/76 |
| 2012/0164955 A1* | 6/2012 | Amirijoo | H04W 52/0203 455/67.11 |
| 2013/0085067 A1* | 4/2013 | Schofield | A01N 43/16 514/25 |
| 2013/0331466 A1* | 12/2013 | Gross | A61Q 5/12 424/455 |
| 2014/0178444 A1 | 6/2014 | Stadler et al. | |
| 2014/0323757 A1 | 10/2014 | Kim | |
| 2015/0299556 A1* | 10/2015 | Gunawan | C09K 8/54 507/260 |
| 2015/0300139 A1* | 10/2015 | Armstrong | C09K 8/685 166/305.1 |
| 2016/0280733 A1* | 9/2016 | Araki | A23L 29/10 |
| 2016/0324747 A1 | 11/2016 | Ito et al. | |
| 2017/0014489 A1 | 1/2017 | Suzuki et al. | |
| 2017/0044424 A1 | 2/2017 | Dwarakanath et al. | |
| 2017/0143753 A1* | 5/2017 | Gross | A01N 43/16 |
| 2019/0359562 A1 | 11/2019 | Lyman et al. | |
| 2021/0284604 A1 | 9/2021 | Gambogi et al. | |

FOREIGN PATENT DOCUMENTS

| | | | | |
|---|---|---|---|---|
| EP | 1953237 A1 | 8/2008 | | |
| FR | 2670798 A1 * | 6/1992 | ............. | C12P 19/44 |
| JP | H07118284 A | 5/1995 | | |
| JP | 2014185106 A | 10/2014 | | |
| JP | 2014185106 A1 * | 10/2014 | ............. | A61K 47/26 |
| WO | 2006069175 A2 | 6/2006 | | |
| WO | 2011008570 A2 | 1/2011 | | |
| WO | 2011127101 A1 | 10/2011 | | |
| WO | 2013003291 A2 | 1/2013 | | |
| WO | 2014120247 A1 | 8/2014 | | |
| WO | 2015164327 A1 | 10/2015 | | |
| WO | 2018049182 A2 | 3/2018 | | |
| WO | 2021127339 A1 | 6/2021 | | |
| WO | 2021173316 A1 | 9/2021 | | |
| WO | 2021236904 A1 | 11/2021 | | |

OTHER PUBLICATIONS

Ahn, C., et al., "Tuning surface-active properties of bio-surfactant sophorolipids by varying fatty-acid chain lengths." Korean Journal of Chemical Engineering, 33.7 (2016): pp. 2127-2133.

Azim, A., et al., "Amino Acid Conjugated Sophorolipids: A New Family of Biologically Active Functionalized Glycolipids." Bioconjugate Chemistry, 17.6 (2006): pp. 1523.1529.

Bisht, K.S., et al., "Enzyme-Mediated Regioselective Acylations of Sophorolipids." The Journal of Organic Chemistry, 64.3 (1999): pp. 780-789.

Carr, J.A., et al., "Enzyme-catalyzed regioselective transesterification of peracylated sophorolipids." Tetrahedron, 59.39 (2003): pp. 7713-7724.

Delbeke, E.I.P., et al., "Chemical and enzymatic modification of sophorolipids." Green Chemistry, 18.1 (2016): pp. 76-104.

Delbeke, E.I.P., et al., "A new class of antimicrobial biosurfactants: quaternary ammonium sophorolipids." Green Chemistry, 17.6 (2015): pp. 3373-3377.

Delbeke, E.I.P., et al., "Sophorolipid Amine Oxide Production by a Combination of Fermentation Scale-up and Chemical Modification." Industrial & Engineering Chemistry Research, 55.27 (2016): pp. 7273-7281.

Jahan, R., et al., "Biosurfactants, natural alternatives to synthetic surfactants: Physicochemical properties and applications." Advances in Colloid and Interface Science, 275.102061 (2020): pp. 1-22.

Koh, A., et al., "Molecular editing of sophorolipids by esterification of lipid moieties: Effects on interfacial properties at paraffin and synthetic crude oil-water interfaces." Colloids and Surfaces A: Physicochemical and Engineering Aspects, 507 (2016): pp. 170-181.

Koh, A., et al., "A versatile family of sophorolipid esters: Engineering surfactant structure for stabilization of lemon oil-water interfaces." Colloids and Surfaces A: Physicochemical and Engineering Aspects, 507 (2016): pp. 152-163.

Peng, Y., et al., "Poly(sophorolipid) Structural Variation: Effects on Biomaterial Physical and Biological Properties." Biomacromolecules, 15.11 (2014): pp. 4214-4227.

Price, N.P.J., et al., "Structural characterization of novel sophorolipid biosurfactants from a newly identified species of Candida yeast." Carbohydrate Research, 348 (2012): pp. 33-41.

Singh, S., et al., "A direct method for the preparation of glycolipid-metal nanoparticle conjugates: sophorolipids as reducing and capping agents for the synthesis of water re-dispersible silver nanoparticles and their antibacterial activity." New Journal of Chemistry, 33.3 (2009): pp. 646-652.

Van Bogaert, I.N.A., et al., "Microbial production and application of sophorolipids." Applied Microbiology and Biotechnology, 76 (2007): pp. 23-34.

Wang, H., et al., "Stereocontrolled Syntheses of All Four Stereoisomeric 1,N 2-Deoxyguanosine Adducts of the Lipid Peroxidation Product trans-4-Hyrdoxynonenal." Organic Letters, 3.22 (2001): pp. 3603-3605.

You, J.S., et al., "Hydrolytic metalloenzyme models: Enantioselective hydrolysis of long chain α-amino acid esters by chiral metallomicelles composed of lipophilic l-histidinol." Journal of Molecular Catalysis A: Chemical, 202.1-2 (2003): pp. 17-22.

Zeidler, J.M., et al., "Synthesis of azathia-analogues of platelet activating factor containing a methioniol backbone." Chemistry and Physics of Lipids, 56.2-3 (1990): pp. 175-183.

Zerkowski, J.A., et al., "Head Group-Modified Sophorolipids: Synthesis of New Cationic, Zwitterionic, and Anionic Surfactants." Journal of Surfactants and Detergents, 9 (2006): pp. 57-62.

Li, S., et al. "Biological tailoring of novel sophorolipid molecules and their derivatives." Biofuels, Bioproducts and Biorefining 15.6 (2021): 1938-1949.

* cited by examiner

Sophorose | Fatty acid

PH- AND TEMPERATURE-STABLE ETHERIC SOPHOROLIPIDS AND THEIR USE

CROSS-REFERENCE TO RELATED APPLICATION

This application is a National Stage Application of International Application No. PCT/US2023/068032, filed Jun. 7, 2023; which claims priority to U.S. Provisional Patent Application No. 63/350,093, filed Jun. 8, 2022, both of which is-are incorporated herein by reference in their entirety.

BACKGROUND OF THE INVENTION

Sophorolipids are classified as glycolipid biosurfactants as they are produced by fermentation of microbes, such as *Starmerella bombicola*, using carbohydrate and lipids as carbon sources.

Sophorolipids are amphiphilic molecules containing a hydrophilic carbohydrate group (sophorose) and a hydrophobic fatty acid. Sophorose is a disaccharide that consists of two glucose molecules linked via a β-1,2 bond. The sophorose in sophorolipids can be acetylated, particularly at the 6'- and/or 6"-positions. The fatty acid in sophorolipids is glycosidically attached to the sophorose molecule through a hydroxyl group, and its terminal carboxylic acid group is either free (as shown in FIG. 1) or internally esterified, generally at the 4"-position (i.e., lactonic form as shown in FIG. 2). The fatty acid of sophorolipids generally has 16 or 18 carbon atoms with one unsaturation. However, it can consist of chain lengths from C12 to C22 having various degrees and positions of unsaturation.

Sophorolipids are frequently produced as a mixture of related molecules. Differences among the related molecules arise mainly from: their fatty acid structure (degree of unsaturation, chain length, position(s) of unsaturation and position of hydroxylation); whether they are produced in the free or lactonic form; the acetylation pattern; the presence of stereoisomers; and/or whether the glycosidic bond on the fatty acid is at the ω-position (terminal) or ω-1 position (sub-terminal).

Sophorolipids have many advantageous characteristics that make them superior to synthetic surfactants, such as biodegradability, low toxicity, high surface and interfacial activities, and stability under a wide range of temperatures, pressures, and ionic strengths. Therefore, sophorolipids have been reported to have diverse applications in, for example, food preservation, biomedicine, cosmetics, bioremediation, remediation of heavy metals, cement slurries, and agriculture and livestock production, etc.

On the other hand, functional properties of sophorolipids can differ between lactonic and free (also called "acidic" or "linear") forms. For example, acidic sophorolipids generally have higher hydrophile-lipophile balance (HLB) than lactonic sophorolipids, while lactonic sophorolipids generally have lower HLB and greater surface tension-reducing properties than acidic sophorolipids. Additionally, acidic sophorolipids are typically highly water soluble due to their free carboxylic acid groups. Combining lactonic and acidic sophorolipids in different ratios affects, e.g., emulsion droplet size, viscosity reducing properties, and surface/interfacial tension reduction properties. In other instances, certain applications may call exclusively for lactonic sophorolipids because of their properties.

One issue relating to lactonic sophorolipids is their sensitivity to the surrounding environment. Specifically, lactonic sophorolipids are susceptible to ring opening thereby transforming to their acidic form depending on the surrounding environment, such as temperature and pH. For example, a change in pH of the environment from outside the range of about 4-7 may cause hydrolysis of the ester bond of the lactone ring, thereby increasing the relative proportion of the acidic sophorolipids in the mixture.

Thus, there is a need for lactonic sophorolipids, or their equivalent, with improved stability. Such improvement would offer better control and predictability of the properties of a given sample of sophorolipids, making quality control easier in diverse areas in which sophorolipids are being utilized. Furthermore, sophorolipids with improved stability would expand their potential use in various other applications that were previously considered not possible because of the environments in which lactonic sophorolipids are or can be unstable.

BRIEF SUMMARY OF THE INVENTION

One aspect of the present invention provides modified sophorolipids of the formula (I):

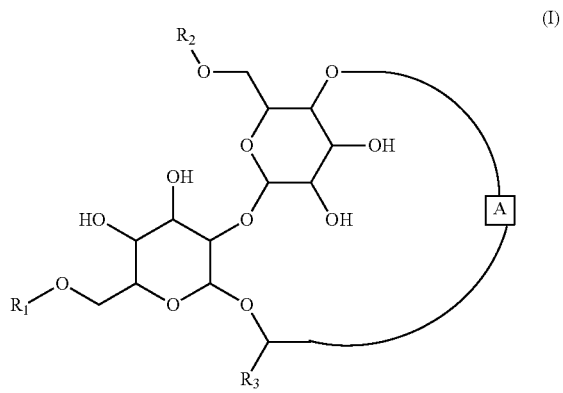

wherein:
$R_1$ and $R_2$ are each independently hydrogen, ethyl (—$CH_2CH_3$), or acetyl (—$COCH_3$);
$R_3$ is hydrogen or methyl; and
A is a saturated or unsaturated aliphatic chain that is optionally substituted.

In some embodiments, the aliphatic chain A has 10 to 21 carbons such that the total number of carbons in the aliphatic chain A, $R_3$, and the carbon to which $R_3$ is attached is 12 to 22 carbons.

The present invention encompasses all of the compounds represented by the general formula (I), including hydrates thereof, geometric and optical isomers thereof, and polymorphic forms thereof.

The compound according to the present invention is more pH-and temperature stable compared to its lactonic counterparts. Moreover, the compound of formula (I) has reduced HLB parameters, as well as improved wetting and solubilization parameters, water-in-oil emulsification ability, surface tension-lowering activity, and/or antimicrobial activity compared to their acidic or even lactonic counterparts. Thus, the compound has a wide variety of applications in diverse industries including, but are not limited to, food, bioremediation, petroleum, agriculture, livestock, and aquaculture.

DETAILED DESCRIPTION OF THE INVENTION

Modified Sophorolipids

Figure 1:
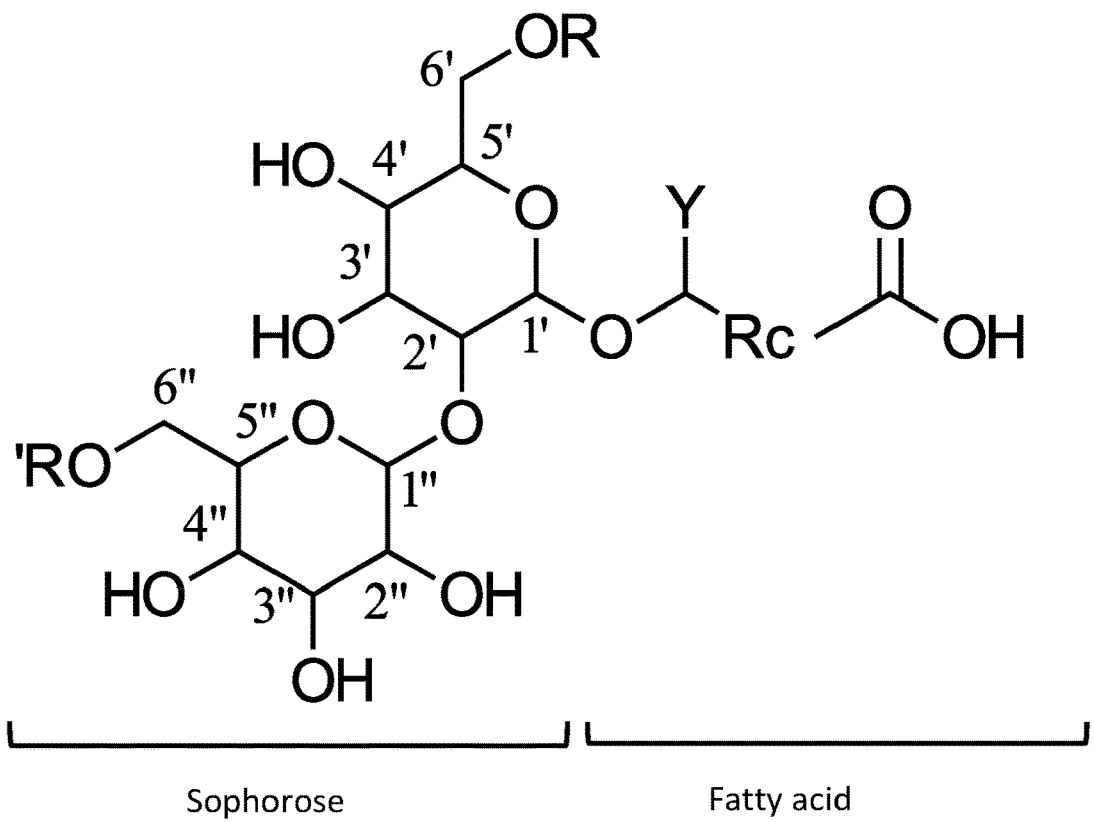
FIG. 1 illustrates an exemplary general structure of free acidic forms of sophorolipids, wherein: Y is hydrogen or methyl; R and R' are each independently hydrogen or acetyl; $R_c$ denotes a saturated or unsaturated aliphatic hydrocarbon chain of typically about C10 to C20 in length, having various degrees and positions of unsaturation.

In one aspect, the present invention provides modified sophorolipids of the general formula (I), which is a cyclic ether analog of lactonic sophorolipids.

The present invention provides a compound of the formula (I):

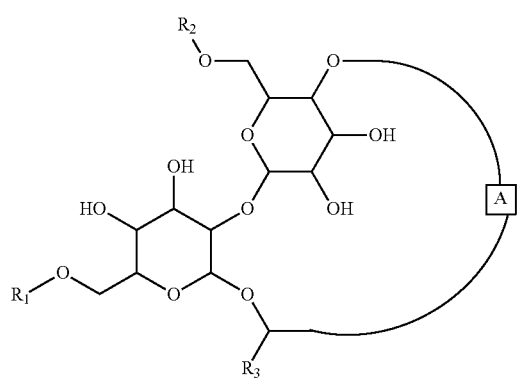

(I)

wherein:
$R_1$ and $R_2$ are each independently hydrogen, ethyl (—$CH_2CH_3$), or acetyl (—$COCH_3$);
$R_3$ is hydrogen or methyl (—$CH_3$); and
A is a saturated or unsaturated aliphatic chain that is optionally substituted.

In preferred embodiments, the aliphatic chain A has 10 to 21 carbons such that the total number of carbons in the aliphatic chain A, $R_3$, and the carbon to which $R_3$ is attached ("the ring chain") is 12 to 22 carbons.

In some embodiments, the total number of carbons in the ring chain is 18 carbons. The ring chain can be either saturated or unsaturated. In specific embodiments, an unsaturated ring chain has a C=C bond at position 8 or 9 and can be a cis or trans isomer.

Optionally, the aliphatic chain is substituted. For example, substitution at the carbon position 8 or 9 in the ring chain is possible through olefin chemistry. Substituents include halogen atoms, hydroxyl, lower (C1-6) alkyl groups, halo lower (C1-6) alkyl groups, hydroxy lower (C1-6) alkyl groups, halo lower (C1-6) alkoxy groups, and the like. Preferred halogen atoms or halogen atoms bound to alkyl groups or alkoxy groups include fluorine, chlorine, bromine, and iodine. When determining the total number of carbons in the ring chain, the number of carbons in the substituents is not considered.

According to some embodiments, $R_1$ and $R_2$ are both ethyl, $R_3$ is methyl, and A is an unsaturated aliphatic chain having 16 carbons with one, two, or three unsaturation.

According to some embodiments, $R_1$ and $R_2$ are both ethyl, $R_3$ is hydrogen, and A is an unsaturated aliphatic chain having 17 carbons with one, two, or three unsaturation.

According to some embodiments, $R_1$ is ethyl, $R_2$ is hydrogen, $R_3$ is methyl, and A is an unsaturated aliphatic chain having 16 carbons with one, two, or three unsaturation.

According to some embodiments, $R_1$ is ethyl, $R_2$ is hydrogen, $R_3$ is hydrogen, and A is an unsaturated aliphatic chain having 17 carbons with one, two, or three unsaturation.

According to some embodiments, $R_1$ is hydrogen, $R_2$ is ethyl, $R_3$ is methyl, and A is an unsaturated aliphatic chain having 16 carbons with one, two, or three unsaturation.

According to some embodiments, $R_1$ is hydrogen, $R_2$ is ethyl, $R_3$ is hydrogen, and A is an unsaturated aliphatic chain having 17 carbons with one, two, or three unsaturation.

According to some embodiments, $R_1$ and $R_2$ are both hydrogen, $R_3$ is methyl, and A is an unsaturated aliphatic chain having 16 carbons with one, two, or three unsaturation.

According to some embodiments, $R_1$ and $R_2$ are both hydrogen, $R_3$ is hydrogen, and A is an unsaturated aliphatic chain having 17 carbons with one, two, or three unsaturation.

According to other embodiments, $R_1$ and $R_2$ are each independently hydrogen, ethyl, or acetyl, $R_3$ is methyl, and A is an unsaturated aliphatic chain having 16 carbons with one unsaturation.

According to other embodiments, $R_1$ and $R_2$ are each independently hydrogen, ethyl, or acetyl, $R_3$ is hydrogen, and A is an unsaturated aliphatic chain having 17 carbons with one unsaturation.

According to further embodiments, $R_1$ and $R_2$ are each independently hydrogen, ethyl, or acetyl, $R_3$ is methyl, and A is an unsaturated aliphatic chain having 16 carbons with two unsaturation.

According to further embodiments, $R_1$ and $R_2$ are each independently hydrogen, ethyl, or acetyl, $R_3$ is hydrogen, and A is an unsaturated aliphatic chain having 17 carbons with two unsaturation.

According to further embodiments, $R_1$ and $R_2$ are each independently hydrogen, ethyl, or acetyl, $R_3$ is methyl, and A is an unsaturated aliphatic chain having 16 carbons with three unsaturation.

According to further embodiments, $R_1$ and $R_2$ are each independently hydrogen, ethyl, or acetyl, $R_3$ is hydrogen, and A is an unsaturated aliphatic chain having 17 carbons with three unsaturation.

According to other embodiments, $R_1$ and $R_2$ are each independently hydrogen, ethyl, or acetyl, $R_3$ is methyl, and A is a fully saturated aliphatic chain having 16 carbons.

According to other embodiments, $R_1$ and $R_2$ are each independently hydrogen, ethyl, or acetyl, $R_3$ is hydrogen, and A is a fully saturated aliphatic chain having 17 carbons.

The present invention covers all of the compounds represented by the general formula (I), including hydrates thereof, geometric and optical isomers thereof, and polymorphic forms thereof. Preferably, the compound of the general formula (I) is derived from lactonic sophorolipids. In some embodiments, the lactonic sophorolipids are produced as a result of fermentation of a sophorolipid-producing organism.

The cyclic ether structure reduces the pH instability and the temperature sensitivity associated with the corresponding lactonic sophorolipids. The compound of the present invention is stable at pH of about 3 to about 14 and/or a temperature of up to about 100° C. Moreover, the compound of formula (I) has reduced HLB values compared to its lactonic counterpart. This leads to improved wetting and solubilization parameters, water-in-oil emulsification ability, surface tension-lowering activity, and/or antimicrobial activity compared to their acidic or lactonic counterparts.

Sophorolipids

In some embodiments, the modified sophorolipids according to the present invention are prepared by chemically modifying sophorolipids. Sophorolipids are generally obtained from fermentations by microorganisms that use as carbon sources pure fatty acids, fatty acid mixtures, pure fatty acid esters, mixtures of fatty acid esters, triglycerides along with carbohydrate sources such as corn syrup, dextrins and glucose. The microorganisms can be a wild-type or engineered yeast strain. As shown in FIG. 1, sophorolipids generally comprise a sophorose that may or may not be acetylated at the 6' and 6" positions and a hydroxylated fatty acid tail with various degrees of unsaturation. Most commonly, the fatty acids consist of 16 or 18 carbon atoms with at least one degree of unsaturation, but the fatty acid structure varies depending on the carbon sources provided during the production (e.g., degree of unsaturation, chain length) and the microorganisms conducting the fermentation.

The production of sophorolipids with the use of renewable substrates and different microbial species, as well as the variation in culture parameters (incubation time, stirring speed, pH of the medium and added nutrients), allow for the acquisition of compounds with distinct structural and physical properties. This makes it possible to produce a wide variety of compounds that have different physical, chemical, biochemical, and/or biophysical properties.

Figure 2:
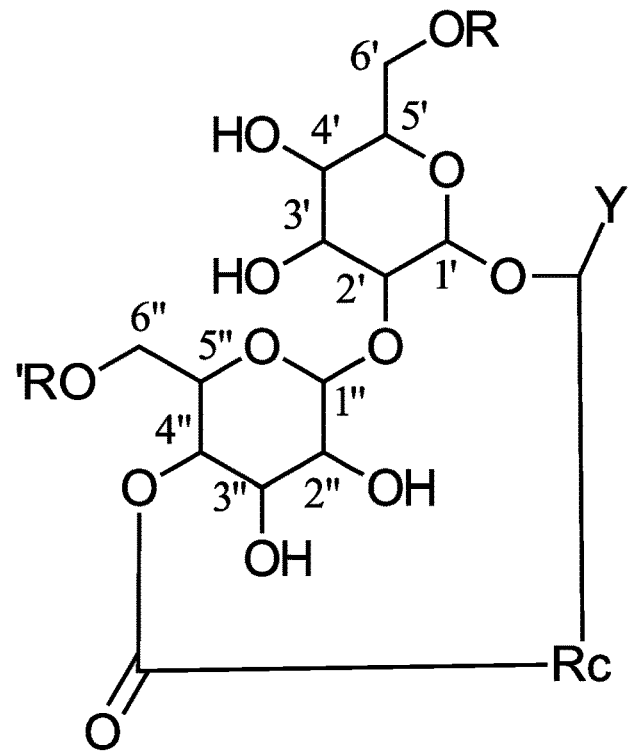
FIG. 2 illustrates an exemplary general structure of lactonic forms of sophorolipids, wherein Y, R, R', and $R_c$ are as defined in FIG. 1.

The hydrophobic fatty acid tail of sophorolipids normally is terminally or sub-terminally linked glycosidically to the sophorose molecule. The fatty acid carboxylic acid group in sophorolipids is either free (see FIG. 1, also called "acidic" or "linear" form) or intramolecularly esterified, generally at the 4"-position (see, e.g., in FIG. 2). The degree of lactonization of sophorolipids and acetylation of the sophorose portion may be influenced by, inter alia, the carbon source fed during sophorolipid production. For example, it has been found that sophorolipids derived from rapeseed, sunflower, and palm oils rich in C18:0 and C18:1 fatty acids are formed with higher levels of diacetylated lactones than sophorolipids produced from the corresponding fatty acid ester feedstocks.

Sophorolipids have environmental compatibility, high biodegradability, low toxicity, high selectivity, and specific activity in a broad range of temperature, pH, and salinity conditions.

Fermentation

In some embodiments, the modified sophorolipids according to the present invention are prepared by chemically modifying sophorolipids that have been produced by a fermentation process known in the art in the presence of select fatty acids and carbohydrate feedstocks. As used herein "fermentation" refers to growth of cells under controlled conditions. The growth could be aerobic or anaerobic. The fermentation processes known in the art include, but are not limited to, solid-state fermentation, submerged fermentation, or modifications, hybrids and/or combinations thereof.

The sophorolipids according to the present invention can be derived via a fermentation process from a recombinant organism or by a strain that naturally produces sophorolipids. Non-limiting examples of sophorolipid-producing organisms include *Candida bombicola, Candida apicola, Candida bogoriensis, Yarrowia lipolytica, Starmerella bombicola, Starmerella clade, Rhodotorula bogoriensis, Wickerhamiella domericqiae*, and *Wickerhamomyces anomalus*. Some recombinant sophorolipid-producing microbes have been reported to control sophorolipid structures. As a non-limiting example, certain recombinant *S. bombicola* strains may be utilized to produce either solely lactonic or solely acidic sophorolipids (see, e.g., Roelants et. al., *Towards the Industrialization of New Biosurfactants: Biotechnological Opportunities for the Lactone Esterase Gene from Starmerella Bombicola*, 113 Biotechnology and Bioengineering 3, 550-559 (2015)). As an additional non-limiting example, a recombinant *Candida bombicola* strain with an acetyltransferase gene knockout can be used to produce sophorolipids without acetylation (see WO 2012/080116).

The microorganisms of interest can be cultivated at small or large scale on site and utilized, even being still-mixed with their media. The sophorolipids of the present invention can also be produced at large quantities at the site of need. The growth vessel used for growing sophorolipid-producing organisms can be any fermenter or cultivation reactor for industrial use.

In one embodiment, a single type of microorganism is grown in a reactor system. In alternative embodiments, multiple microorganisms, which can be grown together without deleterious effects on growth or the resulting product, can be grown in a single reactor system. There may be, for example, 2 to 3 or more different microorganisms grown in a single reactor at the same time. In some embodiments, more than one microorganism grows symbiotically in the reactor.

In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

The cultivation may be supplemented with a carbon source. The carbon source is typically a carbohydrate, such as glucose, sucrose, lactose, fructose, trehalose, mannose, mannitol, and/or maltose, preferably glucose; organic acids such as acetic acid, fumaric acid, citric acid, propionic acid, malic acid, malonic acid, and/or pyruvic acid; alcohols such as ethanol, isopropyl, propanol, butanol, pentanol, hexanol, isobutanol, and/or glycerol; fats and oils such as soybean oil, rice bran oil, canola oil, olive oil, corn oil, sesame oil, and/or linseed oil; etc. These carbon sources may be used independently or in a combination of two or more.

The cultivation can be supplemented with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The growing culture in the cultivation can also be oxygenated. One embodiment utilizes slow motion of air to remove low oxygen-containing air and introduce oxygenated air. In the case of submerged fermentation, the oxygenated air may be ambient air supplemented daily through mechanisms including impellers for mechanical agitation of the liquid, and air spargers for supplying bubbles of gas to the liquid for dissolution of oxygen into the liquid.

In one embodiment, the microorganisms can be grown on a solid or semi-solid substrate, such as, for example, corn, wheat, soybean, chickpeas, beans, oatmeal, pasta, rice, and/or flours or meals of any of these or other similar substances.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, sodium chloride, and/or sodium carbonate. These inorganic salts may be used independently or in a combination of two or more.

In some embodiments, when, for example, the microbes used to inoculate the substrate are in spore form (e.g., bacterial endospores), germination enhancers can be added to the substrate. Examples of germination enhancers according to the present invention include, but are not limited to, L-alanine, manganese, L-valine, and L-asparagine or any other known germination enhancer.

In some embodiments, additional acids and/or antimicrobials in the liquid medium before and/or during the cultivation process may be added. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

In one embodiment, the cultivation of microorganisms is carried out at about 5° C. to about 100° C., preferably, about 15° C. to about 60° C., more preferably, about 25° C. to about 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment. all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a microbe-free medium or contain cells, spores, mycelia, conidia, or other microbial propagules. In this manner, a quasi-continuous system is created.

In some embodiments, the sophorolipids produced by microorganisms of interest may be retained in the microorganisms or secreted into their growth medium. The sophorolipid content can be, for example, at least 20%, 30%, 40%, 50%, 60%, 70%, 80%, or 90%.

The growth medium may contain compounds that stabilize the activity of the sophorolipids. The sophorolipids can be purified, or the sophorolipids can be used in crude form, meaning they are not separated from the fermentation broth in which they were produced.

In certain embodiments, the sophorolipid is isolated and/or purified from the growth medium resulting from fermentation of a biosurfactant-producing microorganism. Isolation and purification can be easily achieved using standard methods or techniques described in the literature. The sophorolipid can be further concentrated, if desired.

As used herein, the terms "isolated," "purified," or variations thereof when used in connection with biological or natural materials such as glycolipids mean the material is substantially free of other compounds, such as cellular material, with which it is associated in nature. That is, the materials do not occur naturally without these other compounds and/or have different or distinctive characteristics compared with those found in the native material.

In certain embodiments, purified compounds are at least 60% by weight of the compound of interest. Preferably, the preparation is at least 75%, more preferably at least 90%, and most preferably at least 99% (w/w) of the desired compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Modification Methods

In some embodiments, the modified sophorolipids according to the present invention are obtained by application of synthetic methods known in the art to modify sophorolipids that have been obtained from the product of fermentation by sophorolipid-producing microbes. The sophorolipids to be chemically modified may be obtained by fermentation methods and processes as described above and/or any other methods known in the art. Known purification methods may be utilized to purify the sophorolipids from the growth medium as discussed above. The sophorolipids to be modified may be obtained in substantially lactonic forms, substantially acidic forms, or a mixture of lactonic and acidic forms. As used herein, lactonic sophorolipids encompass any isomers of sophorolipids that contain a cyclic ester.

In some embodiments, starting materials for the modified sophorolipids according to the present invention may be pure lactonic sophorolipids that are substantially free of acidic sophorolipids. Advantageously, using pure lactonic sophorolipids as starting materials for the chemical transformation reduces possible side reactions and allows the reaction product to be obtained as pure cyclic ethers of the general formula (I), substantially free of non-cyclic counterparts. Pure lactonic sophorolipids may be obtained directly as a purified product of fermentation, or may be obtained after subjecting the fermentation product containing a mixture of lactonic and acidic sophorolipids to a chemical process known in the art to lactonize the acidic sophorolipids. In other embodiments, lactonic sophorolipids can be isolated from a mixture of lactonic and acidic sophorolipids obtained from fermentation. This can be achieved, for example, by utilizing standard liquid-liquid extraction techniques that exploit differences in the chemical characteristics of lactonic and acidic sophorolipids. That is, the acidic sophorolipids contain a carboxylic acid functional group while the lactonic sophorolipids do not contain a readily ionizable group.

In other embodiments, lactonic sophorolipids to be modified are not isolated from a mixture of lactonic and acidic forms before the modification. Advantageously, this method eliminates the need to separate lactonic sophorolipids from acidic sophorolipids prior to the modification. The modification of lactonic sophorolipids can be carried out by adding the necessary reducing reagents to a mixture of lactonic and acidic sophorolipids after it has been extracted into an organic solvent of choice.

The modification of lactonic sophorolipids according to the present invention involves selective reduction of at least the carbonyl (C=O) group of a fatty acid in sophorolipids to an alkyl (—CH$_2$—) group without reducing other types of functional groups present in the molecule to arrive at the cyclic ether compound of formula (I). A non-limiting, exemplary schematic of the reduction of lactonic sophorolipids is illustrated as hereunder:

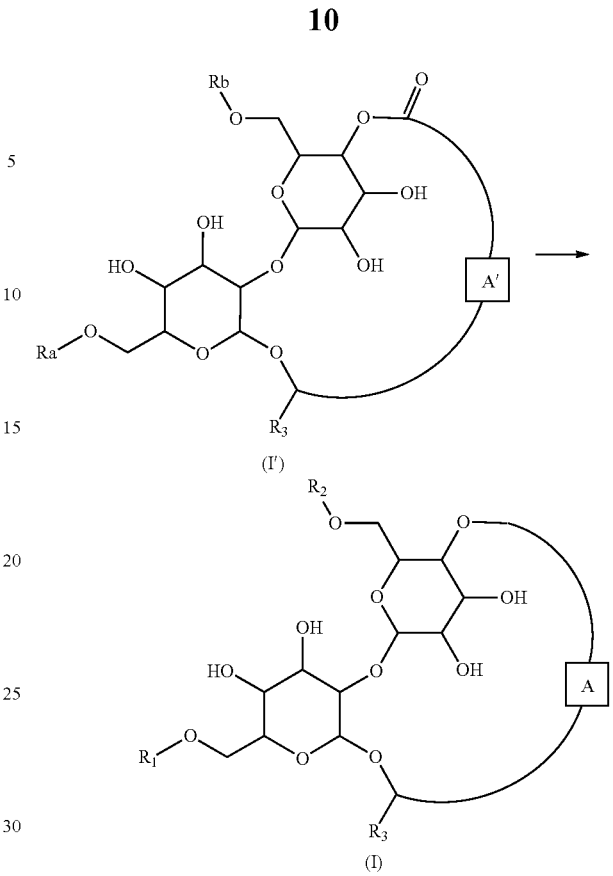

wherein Ra and Rb are each independently hydrogen or acetyl. Furthermore, A' is a saturated or unsaturated aliphatic chain whose chain length is one carbon shorter than A. A' is optionally substituted. If an acetyl group is present at Ra and/or Rb, it may also be reduced to form an ether linkage to the adjacent oxygen as a result of the reduction process. Thus, R$_1$ and R$_2$ can be hydrogen, acetyl, or ethyl.

According to some embodiments of the present invention, reduction of lactonic sophorolipids to obtain the compound of formula (I) is achieved by the use of a reducing agent and a Lewis acid catalyst in an organic solvent. The reaction may be carried out at any suitable temperature. In some embodiments, the reaction is carried out at around 60° C.

The reducing agent according to the invention is any suitable agent that is capable of reducing a carbonyl group in lactonic sophorolipids. Suitable reducing agents include, but are not limited to, a silane hydride source such as triethylsilane (Et$_3$SiH), tris(trimethylsilyl) silane (TTMS), tetraphenyldisilane (TPDS), and/or polyhydromethylsilane (PHMS).

The Lewis acid catalyst according to the invention may be any acid that is compatible with the reducing agent to catalyze the reduction of carbonyl groups in lactonic sophorolipids. Suitable Lewis acid catalysts include, but are not limited to, indium bromide (InBr$_3$), bismuth bromide (BiBr$_3$), titanium alkoxides (e.g., titanium isopropoxide), boron tribromide (BBr$_3$), aluminum bromide (AlBr$_3$), and zinc bromide (Zn(II)Br$_2$). In some embodiments, the Lewis acid catalyst is indium bromide. The Lewis acid catalyst may be present at about 1 mol % to about 25 mol %.

The organic solvent according to the invention may be any non-polar organic solvent that can be used as a reaction medium and suitable for the reduction of lactonic sophorolipids. Suitable organic solvents include, but are not limited to, chloroform ($CHCl_3$), dichloromethane, toluene, 1,4-dioxane, dibromomethane, and bromoform. Preferably, the organic solvent is chloroform.

Figure 3:
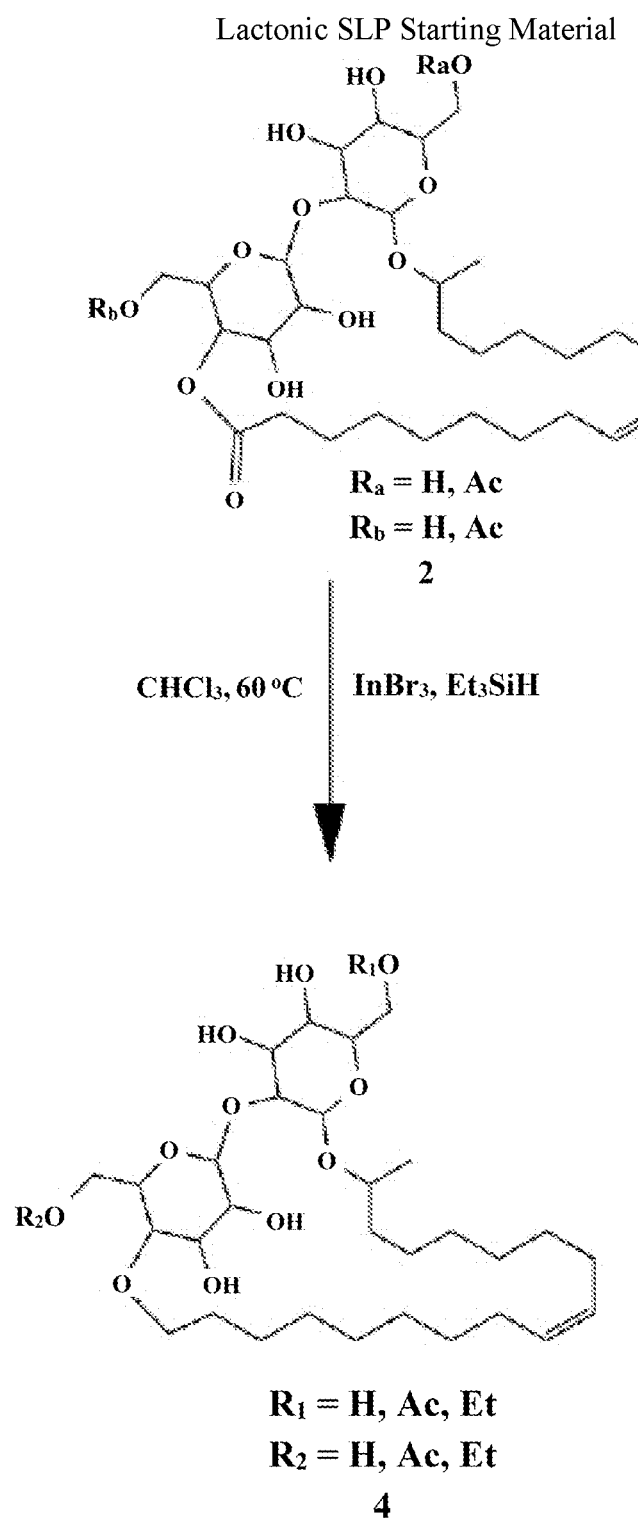
FIG. 3 shows an exemplary reaction scheme to reduce a lactonic sophorolipid (SLP) to obtain a modified sophorolipid according to the present invention.

FIG. 3 shows a non-limiting, exemplary reaction scheme according to the present invention. The starting material is a lactonic sophorolipid provided in either as a pure form or in a mixture comprising lactonic and acidic sophorolipids. Reduction is carried out at 60° C. in $CHCl_3$ utilizing the reagent combination of $Et_3SiH$ and $InBr_3$. The compound labeled "4" is a modified sophorolipid according to the present invention.

Aliphatic Chain A

The aliphatic chain A according to the present invention can be of any length as long as the length is suitable for intramolecular ring formation with the sophorose residue to form the compound of formula (I). Preferably, the total number of carbon atoms in the aliphatic chain A, $R_3$, and the carbon to which $R_3$ is attached (the "ring chain") is 12 to 22 carbons. In certain embodiments, the aliphatic chain A has 10 to 21 carbons. More preferably, the aliphatic chain A has 14 and 17 carbons such that the total number of carbon atoms in the ring chain is 16 to 18. In some embodiments, the total number of carbon atoms in the ring chain is 18.

Furthermore, if the aliphatic chain A is unsaturated, it can have one or more double and/or triple bonds in its chain, as long as the unsaturation does not render the intramolecular ring formation sterically impossible. In case the aliphatic chain A has at least one double bond, geometric isomers of the alkene are well within the scope and purview of the present invention. That is, if the aliphatic chain A has at least one degree of unsaturation, the compound of formula (I) covers both cis and trans isomers.

Moreover, the degree and/or placement of unsaturation as well as the desired isomerism in the aliphatic chain A can be artificially introduced or inherent in the fatty acid from which the aliphatic chain A is derived. In some embodiments, an unsaturation in the ring chain is removed via known chemical processes. Furthermore, a substituent may be introduced at an unsaturation (e.g., double bond) in the ring chain through a synthetic method known in the art. In some embodiments, the degree and position of unsaturation in the aliphatic chain A is inherent in the corresponding fatty acid. For example, if the aliphatic chain A was derived from oleic acid (18:1 cis-9) or elaidic acid (18:1 trans-9), it retains the corresponding isomerism in the same position (i.e., cis-9 or trans-9, respectively).

Nonlimiting examples of fatty acids from which the aliphatic chain A can be derived include caprylic acid, capric acid, lauric acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linolelaidic acid, and arachidonic acid. A preferred fatty acid is oleic acid.

INDUSTRIAL APPLICABILITY

Other aspects of the invention are directed to the use of the compound represented by general formula (I) in a wide variety of applications. The compound may be used not only in areas where conventional sophorolipids are or can be employed, but also in various other areas where their applications were believed to be infeasible due to the environments in which lactonic sophorolipids are unstable. Because the cyclic ether structure of the compound of formula (I) is more pH-and temperature-stable than its lactonic counterpart, some embodiments of the invention replaces or supplements conventional sophorolipids with the compound of formula (I), especially where general properties of lactonic sophorolipids (other than their stability issues) are desirable or preferable. In some embodiments, the compound of formula (I) has a lower HLB value than its counterpart starting compound of formula (I').

In other embodiments, the compound of formula (I) is utilized in areas where reduced HLB values which lead to improved wetting and solubilization parameters, and/or improved water-in-oil emulsification ability, are desirable or needed. In further embodiments, the compound of formula (I) can be used where enhancement of surface tension-lowering activity and/or antimicrobial activity is desirable or needed.

Exemplary applications of the compound of formula (I) include, but are not limited to, their use as food additives or supplements, pharmaceutical actives or adjuvants, cosmetic ingredients, and ingredients in cleaning products. The compound of formula (I) can also be utilized in bioremediation and remediation of heavy metals, as well as in the petroleum industry, for example, for drilling, cement slurries, fracturing, enhanced oil recovery, scale formation prevention, acidization, demulsification of crude fluids, corrosion inhibition, reduced oil viscosity, cleaning of equipment, water-flooding, and/or foam and steam flooding. Furthermore, in agriculture, aquaculture, and livestock production, the compound of formula (I) can be used as, for example: soil amendments; broad spectrum biopesticides, antiviral, antifungal, and antibacterial agents; feed additives such as for enhancing nutrient absorption or feed preservation; nutritional sources; and/or treatment agents for diseases or infections in plants, fish, and livestock. The compound of formula (I) can also be utilized in environmental fields, such as for reducing greenhouse gases.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention, e.g., the ability to improve the bioavailability of a substance. Use of the term "comprising" contemplates other embodiments that "consist" or "consist essentially" of the recited component(s).

Unless specifically stated or obvious from context, as used herein, the term "or" is understood to be inclusive. Unless specifically stated or obvious from context, as used herein, the terms "a," "an" and "the" are understood to be singular or plural.

Unless specifically stated or obvious from context, as used herein, the term "about" is understood as within a range of normal tolerance in the art, for example, within 2 standard deviations of the mean. As further examples, "about" can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

EXAMPLES

Following are examples of the present invention which are offered by way of illustration and are not intended to limit the invention. Various modifications or changes within the spirit and purview of this application will be suggested to and understood by persons skilled in the art.

Example 1: Exemplary Compounds

The numbers in the left most column represent compound numbers. The present invention covers all of the compounds represented by the general formula (I), including hydrates thereof, geometric and optical isomers thereof, and polymorphic forms thereof.

| Compound Number | Chemical Structure |
| --- | --- |
| 1 | 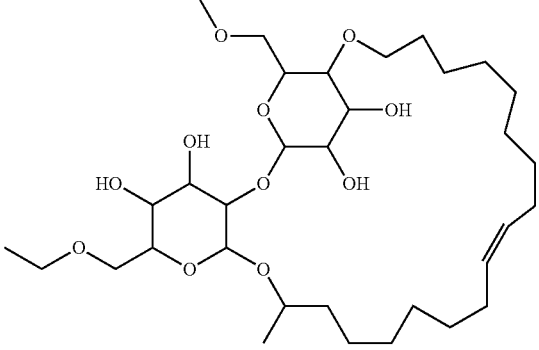 [SMILES: CCOCC1OC2OC(C)CCCCCC/C=C\CCCCCCCCOC3C(COCC)OC(OC2C(O)C1O)C(O)C3O] |
| 2 | 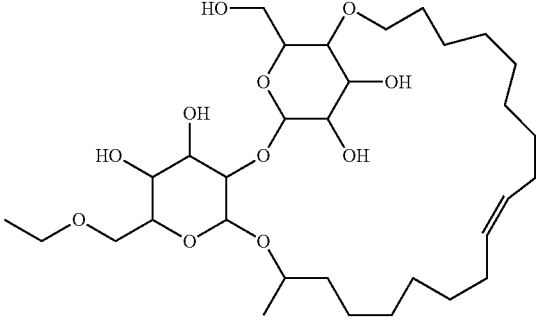 [SMILES: CCOCC1OC2OC(C)CCCCCC/C=C\CCCCCCCCOC3C(CO)OC(OC2C(O)C1O)C(O)C3O] |
| 3 | 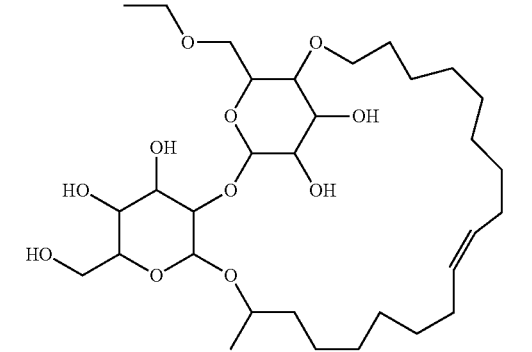 [SMILES: CCOCC1OC2OC3C(OC(C)CCCCCC/C=C\CCCCCCCCOC1C(O)C2O)OC(CO)C(O)C3O] |
| 4 | 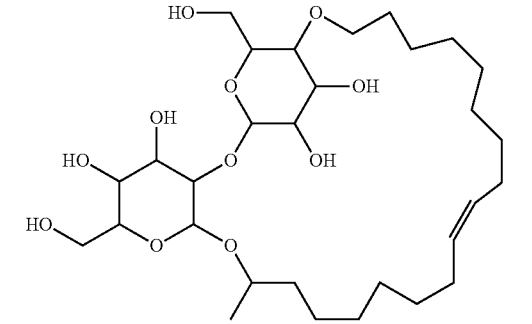 [SMILES: CC1CCCCCC/C=C\CCCCCCCCOC2C(CO)OC(OC3C(O1)OC(CO)C(O)C3O)C(O)C2O] |

-continued
| Compound Number | Chemical Structure |
|---|---|
| 5 | 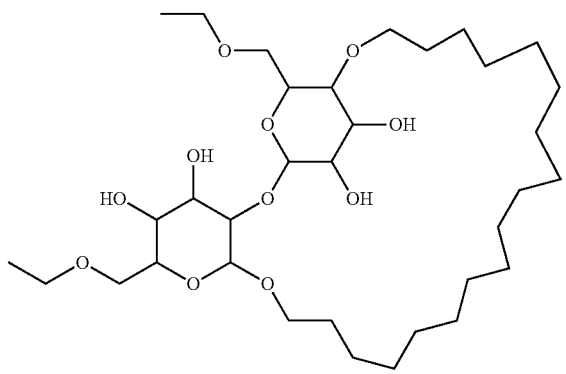 [SMILES: CCOCC1OC2OCCCCCCCCCCCCCCCCCCOC3C(COCC)OC(OC2C(O)C1O)C(O)C3O] |
| 6 | 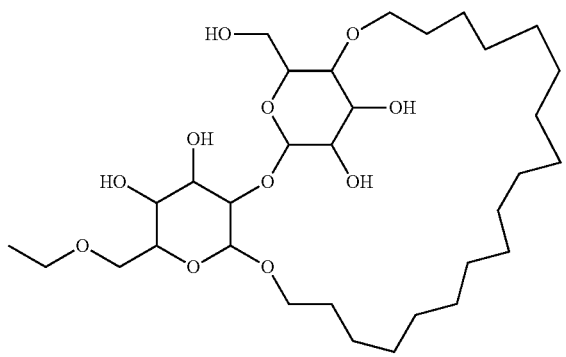 [SMILES: CCOCC1OC2OCCCCCCCCCCCCCCCCCCOC3C(CO)OC(OC2C(O)C1O)C(O)C3O] |
| 7 | 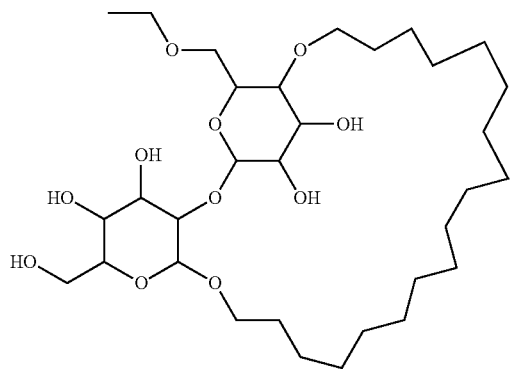 [SMILES: CCOCC1OC2OC3C(OCCCCCCCCCCCCCCCCCCOC1C(O)C2O)OC(CO)C(O)C3O] |
| 8 | 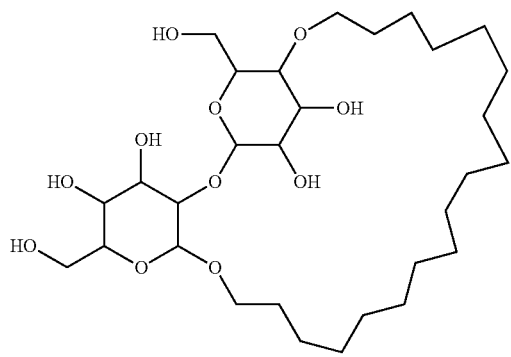 [SMILES: OCC1OC2OCCCCCCCCCCCCCCCCCCOC3C(CO)OC(OC2C(O)C1O)C(O)C3O] |

Example 2: Production of Lactonic Sophorolipids

Preparation

A stainless steel fermentation reactor is used for the production of sophorolipids. The reactor comprises about 150 gallons of water, into which a medium comprising dextrose (25 to 150 g/L), yeast extract (1 to 10 g/L), canola oil (25 ml/L to 110 ml/L) and urea (0.5 to 5 g/L) is added.

The reactor comprises a mixing apparatus for continuous agitation and mixing of the culture. The reactor with medium is steamed at 100° C. for about 60 minutes in order to sterilize the reactor and the growth medium.

The reactor is then allowed to cool down. Once the reactor reaches about 35° C., antibiotics are added to the medium to prevent bacterial contamination. Other reactor tubing and openings are sprayed with isopropyl alcohol (IPA) to sterilize them.

Small-scale reactors are used for growing recombinant *Starmerella bombicola* inoculum cultures. The culture is grown for at least 42 to 48 hours at 26 to 28° C. in the small-scale reactors. The *S. bombicola* strain produces *S. bombicola* lactone esterase, which catalyzes the esterification of linear sophorolipids to produce lactonic sophorolipids.

Once the stainless-steel fermentation reactor reaches 30° C., it is then inoculated with about 25 L of the inoculum culture.

Fermentation

The temperature of fermentation is held at 23 to 28° C. After about 22 to 26 hours, the pH of the culture is set to about 3.0 to 4.0, or about 3.5, using 20% NaOH. The fermentation reactor comprises a computer that monitors the pH and controls the pump used to administer the base, so that the pH remains at 3.5.

After about 6-7 days of cultivation (120 hours +/−1 hour), if 7.5 ml of a sophorolipid layer is visible, the batch is ready for harvesting. In some instances, there is also minimal oil visible and minimal glucose detected (e.g., about 0% to 0.5%).

Harvesting and Purification

The culture is harvested to a first collection container and left undisturbed for 24 to 48 hours. A layer of lactonic-rich sophorolipid settles to the bottom of the first collection container which is collected and can be purified to isolate the lactonic sophorolipids, for example, by liquid-liquid extraction. After purification, the sophorolipids are ready for further modification.

What is claimed is:

1. A compound of formula (I):

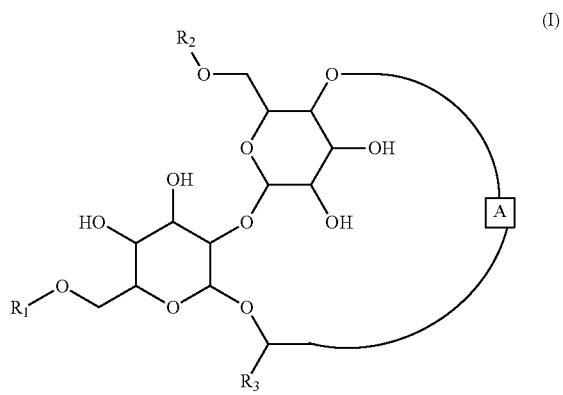

wherein:
$R_1$ and $R_2$ are each independently hydrogen, ethyl, or acetyl;
$R_3$ is hydrogen or methyl; and
A is a saturated or unsaturated aliphatic chain that is optionally substituted.

2. The compound according to claim 1, wherein the aliphatic chain A has 10 to 21 carbons, excluding the substituents, such that the total number of carbons in the aliphatic chain A, $R_3$, and the carbon to which $R_3$ is attached is 12 to 22 carbons.

3. The compound according to claim 2, wherein the aliphatic chain is saturated.

4. The compound according to claim 2, wherein the aliphatic chain is unsaturated.

5. The compound according to claim 1, wherein A is an unsaturated aliphatic chain having 16 or 17 carbon atoms and one double bond.

6. The compound according to claim 1, wherein A is an unsaturated aliphatic chain having 16 or 17 carbon atoms and two double bonds.

7. The compound according to claim 1, wherein A is an unsaturated aliphatic chain having 16 or 17 carbon atoms and three double bonds.

8. The compound according to claim 1, wherein A is further substituted with halogen, hydroxyl, lower (C1-6) alkyl, halo lower (C1-6) alkyl, hydroxy lower (C1-6) alkyl, and/or halo lower (C1-6) alkoxy.

9. The compound according to claim 1, synthesized from a sophorolipid produced by fermentation of a sophorolipid-producing organism using caprylic acid, capric acid, lauric acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, and/or arachidonic acid.

10. The compound according to claim 1, the compound being stable at pH of about 3-14 and/or at a temperature of up to about 100° C.

11. A method of producing a compound according to claim 1 comprising:
reducing at least one carbonyl adjacent to aliphatic chain A' in a compound of formula (I'), in the presence of a reducing agent and a Lewis acid catalyst:

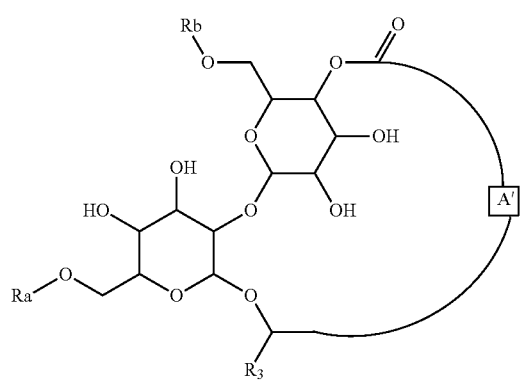

wherein Ra and Rb are each independently hydrogen or acetyl, A' is a saturated or unsaturated aliphatic chain having one carbon less than said aliphatic chain A.

12. The method according to claim 11, wherein the aliphatic chain A has 10 to 21 carbons, excluding the substituents, such that the total number of carbons in the aliphatic chain A, $R_3$, and the carbon to which $R_3$ is attached is 12 to 22 carbons.

13. The method according to claim 12, wherein the aliphatic chain is saturated.

14. The method according to claim 12, wherein the aliphatic chain is unsaturated.

15. The method according to claim 11, wherein A is an unsaturated aliphatic chain having 16 or 17 carbon atoms and one double bond.

16. The method according to claim 11, wherein A is an unsaturated aliphatic chain having 16 or 17 carbon atoms and two double bonds.

17. The method according to claim 11, wherein A is an unsaturated aliphatic chain having 16 or 17 carbon atoms and three double bonds.

18. The method according to claim 11, wherein A is further substituted with halogen, hydroxyl, lower (C1-6) alkyl, halo lower (C1-6) alkyl, hydroxy lower (C1-6) alkyl, and/or halo lower (C1-6) alkoxy.

19. The method according to claim 11, wherein the compound of formula (I) has a reduced HLB value compared to the compound of formula (I').

20. A compound:

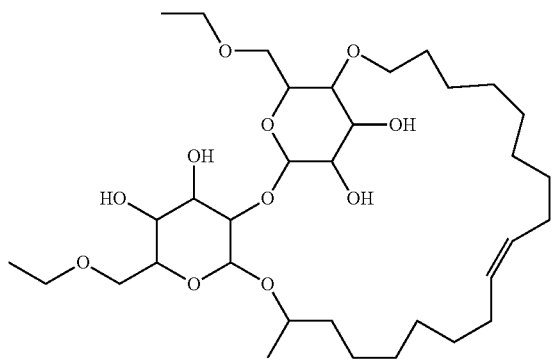

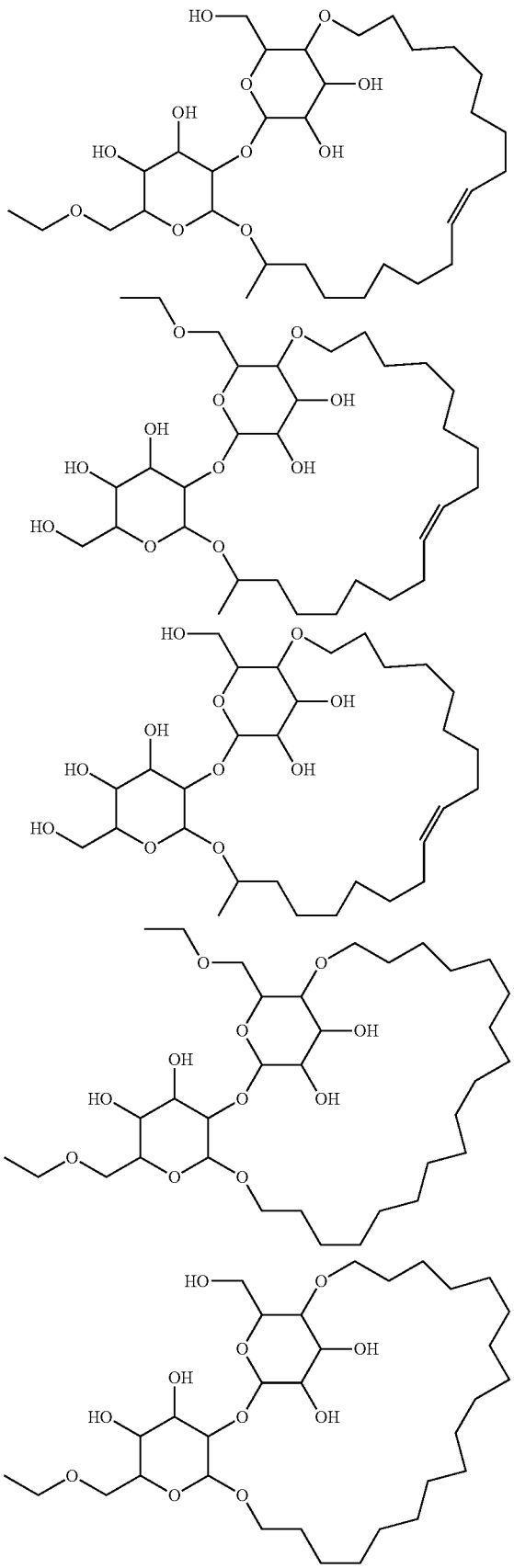

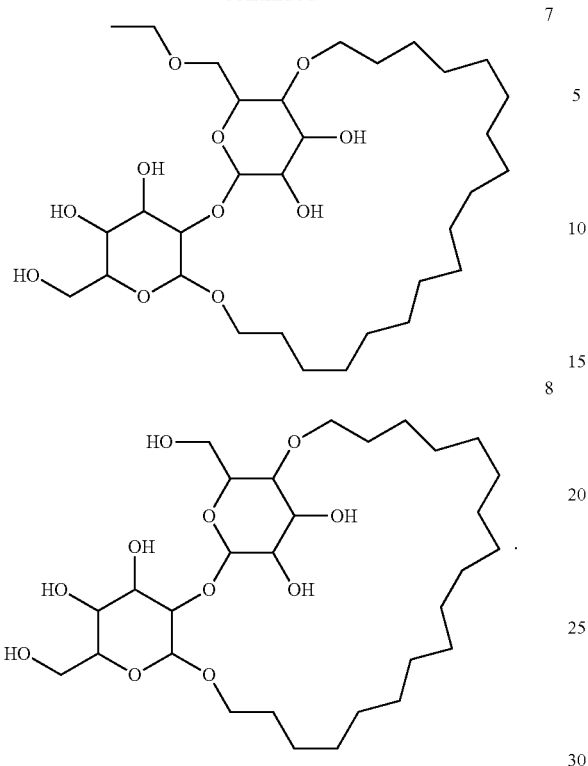
* * * * *